United States Patent [19]

Chen

[11] Patent Number: 5,703,883
[45] Date of Patent: Dec. 30, 1997

[54] EXPANDABLE REPEATER CONTROLLER

[75] Inventor: Jone-Jane Chen, Taipei Hsien, Taiwan

[73] Assignee: United Microelectronics Corporation, Hsinchu, Taiwan

[21] Appl. No.: 536,935

[22] Filed: Sep. 29, 1995

[51] Int. Cl.$^6$ ............................................. H04B 3/36
[52] U.S. Cl. ............................. 370/501; 375/211
[58] Field of Search ............................. 370/282, 293, 370/492, 501, 502; 375/211, 212, 213, 214

[56] References Cited

U.S. PATENT DOCUMENTS

| | | | |
|---|---|---|---|
| 5,226,040 | 7/1993 | Noble, III et al. | 370/465 |
| 5,299,195 | 3/1994 | Shah | 370/501 |
| 5,497,363 | 3/1996 | Gingell | 370/376 |
| 5,517,520 | 5/1996 | Chi | 375/212 |
| 5,557,633 | 9/1996 | Staab et al. | 375/213 |
| 5,574,726 | 11/1996 | Chan et al. | 370/501 |

Primary Examiner—Douglas W. Olms
Assistant Examiner—Min Jung
Attorney, Agent, or Firm—Ladas & Parry

[57] ABSTRACT

An expandable repeater controller for a local area network. The expandable repeater controller has with three expansion ports. An interface signal is transmitted through an EXPOUT port when the expandable repeater controller is going to transmit data through a DAT port. The interface signal is received through an EXPIN port if the expandable repeater controller is required to receive data through DAT port. The operational status of the expandable repeater controller is determined by logic levels of ports EXPOUT and EXPIN. The repeater controller of the invention is provided with an expansion port circuit which includes means for generating synchronous clock signals, means for dealing with data collision conditions and means for transmitting and receiving data as well as the interface signals. The repeater controller further includes an arbiter if more than two repeater controllers are connected for expansion. Two repeater controllers of the present invention are expanded by connecting the EXPOUT port of one controller to the EXPIN port of the other controller and connecting their DAT ports together. Three or more repeater controllers of the present invention are expanded by connecting their EXPOUT and EXPIN ports to the arbiter and connecting their DAT ports together.

6 Claims, 8 Drawing Sheets a
EXPANDABLE REPEATER CONTROLLER

BACKGROUND OF THE INVENTION

The present invention relates to computer networks, and more specifically, to expandable repeater controllers for a local area network (LAN).

LAN systems such as CSMA/CD (Carrier Sense, Multiple Access—Collision Detection) networks have been widely used in commercial applications. In addition to optical fibers, the medium for the CSMA/CD networks include generally coaxial cables and twisted pairs. Though their transmission signals are different, coaxial cables and twisted pairs both meet the IEEE 802.3 standard.

Since coaxial cables connect computers (or workstations) in series to form the LAN, signal restoring or amplifying equipment is necessary to the LAN if the distances between the computers are too great to retain the transmitted signals therein. On the other hand, the LAN with twisted pairs has a point to point structure which requires a connector, such as a HUB, to distribute signals to each transmission line. Therefore, a device having AUI (Attachment Unit Interface) ports for the coaxial cables and TP (Twisted Pair) ports for twisted pairs is provided to satisfy the requirements of both kinds of transmission lines, and, is well-known as a repeater.

The above-mentioned LAN architecture, as shown in FIG. 1, includes repeater (or HUB) 2 and a number of workstations 5 through 9. Through an AUI port, repeater 2 is connected to a backbone cable 3 for interconnecting with other workstations or repeaters of the same network. On the other hand, workstations 5 through 9 are connected with repeater 2 through TP ports.

The repeater has typically a single chip processing unit called a repeater controller. The number of AUI and TP ports provided by the repeater is constrained by the fabrication technology, heat dissipation and packaging of the repeater controller. Accordingly, in order to connect more workstations in the LAN, the repeater must be expanded by combining several repeater controllers. FIG. 2 illustrates a conventional repeater controller with an AUI port, eight TP ports and a number of expansion ports $\overline{COL}$, JAM, DAT, ACK, $\overline{REQ}$ and so on. The repeater is expanded by connecting the expansion ports of various repeater controllers and operated under the control of an arbiter function. For example, referring to FIG. 3, an arbiter is provided to connect three repeater controllers module 1 through module 3. In the past, at least five expansion ports have been necessary for each repeater controller to support data communication. For example, in U.S. Pat. No. 5,265,123, an expandable repeater with five expansion ports is provided for transmitting and/or receiving a REQUEST, an ACKNOWLEDGE, a COLLISION, a JAM and a DATA signal. Since there are various functions, such as transmission, reception and collision of data, between the expanded repeater controllers, the arbiter function becomes so complicated that it must be implemented by a multitude of circuits. Therefore, the expansion of the repeater is inconvenient and results in a high manufacturing cost.

SUMMARY OF THE INVENTION

The present invention provides an expandable repeater controller with minimum expansion ports to facilitate the circuit implementation and reduce the manufacturing cost.

The present invention also provides a method for connecting expandable repeater controllers to simplify the circuit design.

The expandable repeater controller according to the present invention employs a distributed process for data collisions and only three expansion ports are necessary for expansion. The expandable repeater controller sends out an interface signal through an EXPOUT port when the repeater controller is going to transmit data through a DAT port. The interface signal is received through an EXPIN port if the present repeater controller is required to receive data through DAT port. The expandable repeater controller of the invention decides its operation status by logic levels of ports EXPOUT and EXPIN thereof. The operation status includes a data transmitting status, a data receiving status, an idle status and a data collision status.

The repeater controller of the invention is provided with an expansion port circuit which includes a SYNCLK circuit for generating synchronous clock signals; an EXPCOLCTL circuit for dealing with data collision conditions; and an EXPIO circuit for transmitting and receiving data as well as the interface signals. Ports EXPOUT, EXPIN and DAT are provided by the EXPIO circuit. The repeater controller further includes an arbiter if more than two repeater controllers are connected for expansion.

Two repeater controllers of the present invention are expanded by connecting EXPOUT port of one controller to EXPIN port of the other controller and connecting their DAT ports together. Three or more repeater controllers of the present invention are expanded by connecting their EXPOUT and EXPIN ports to the arbiter and connecting their DAT ports together.

BRIEF DESCRIPTION OF THE DRAWING

The above and other features and advantages of the present invention will become more apparent from the following detailed description taken with the accompanying drawings in which.

DETAILED DESCRIPTION OF THE INVENTION

Figure 1:
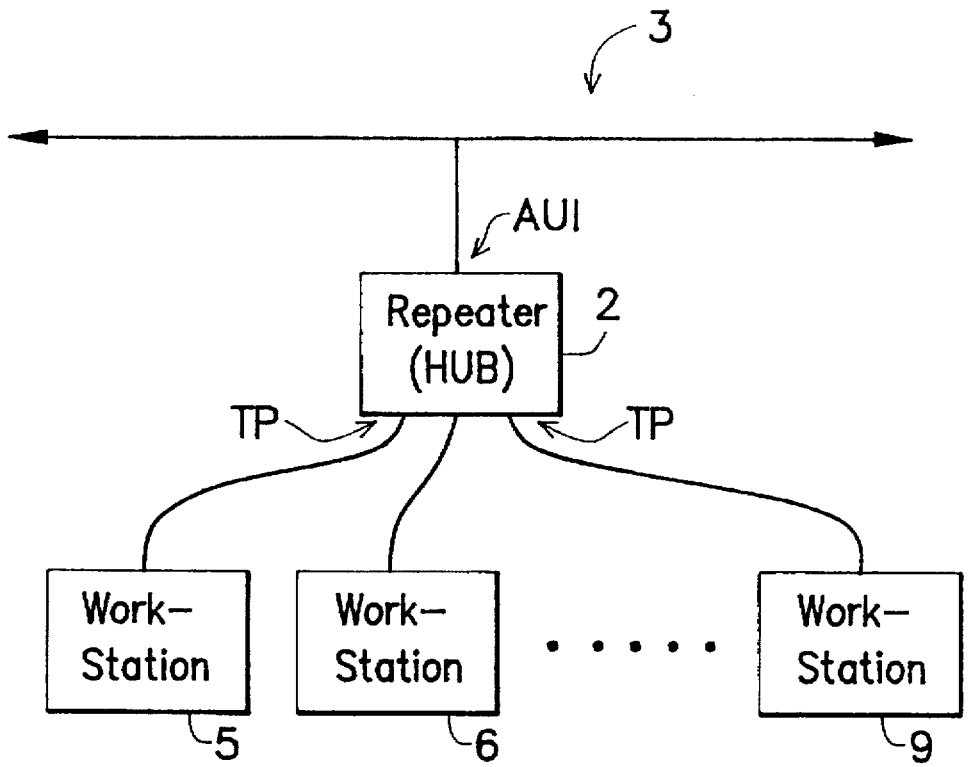
FIG. 1 is a block diagram illustrating a typical prior art LAN repeater coupling workstations to a LAN.
Figure 2:
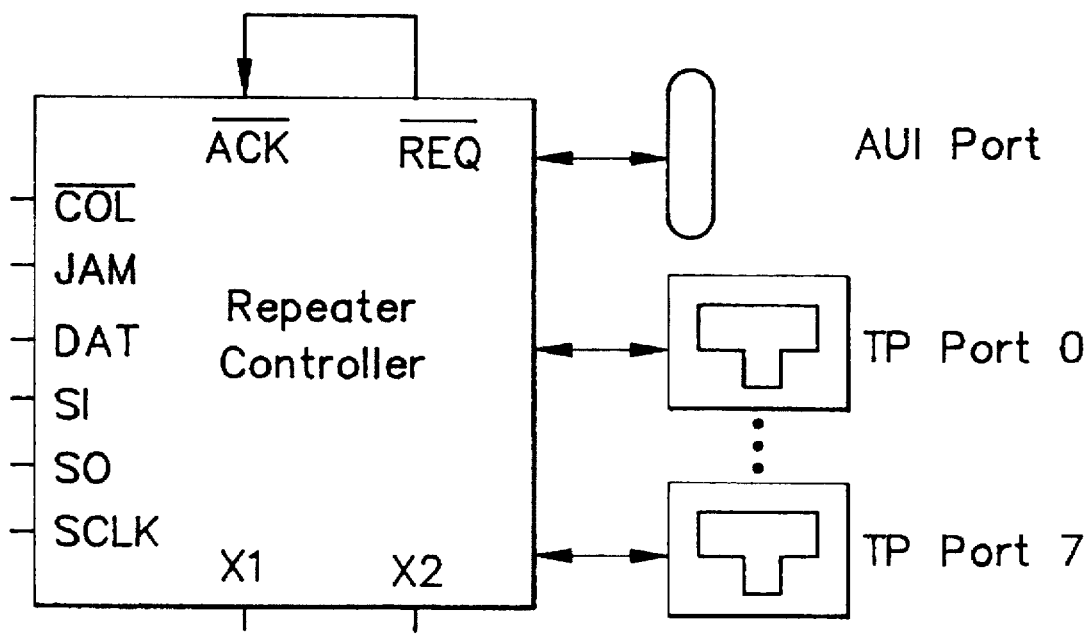
FIG. 2 is a block diagram illustrating a conventional prior art repeater controller.
Figure 3:
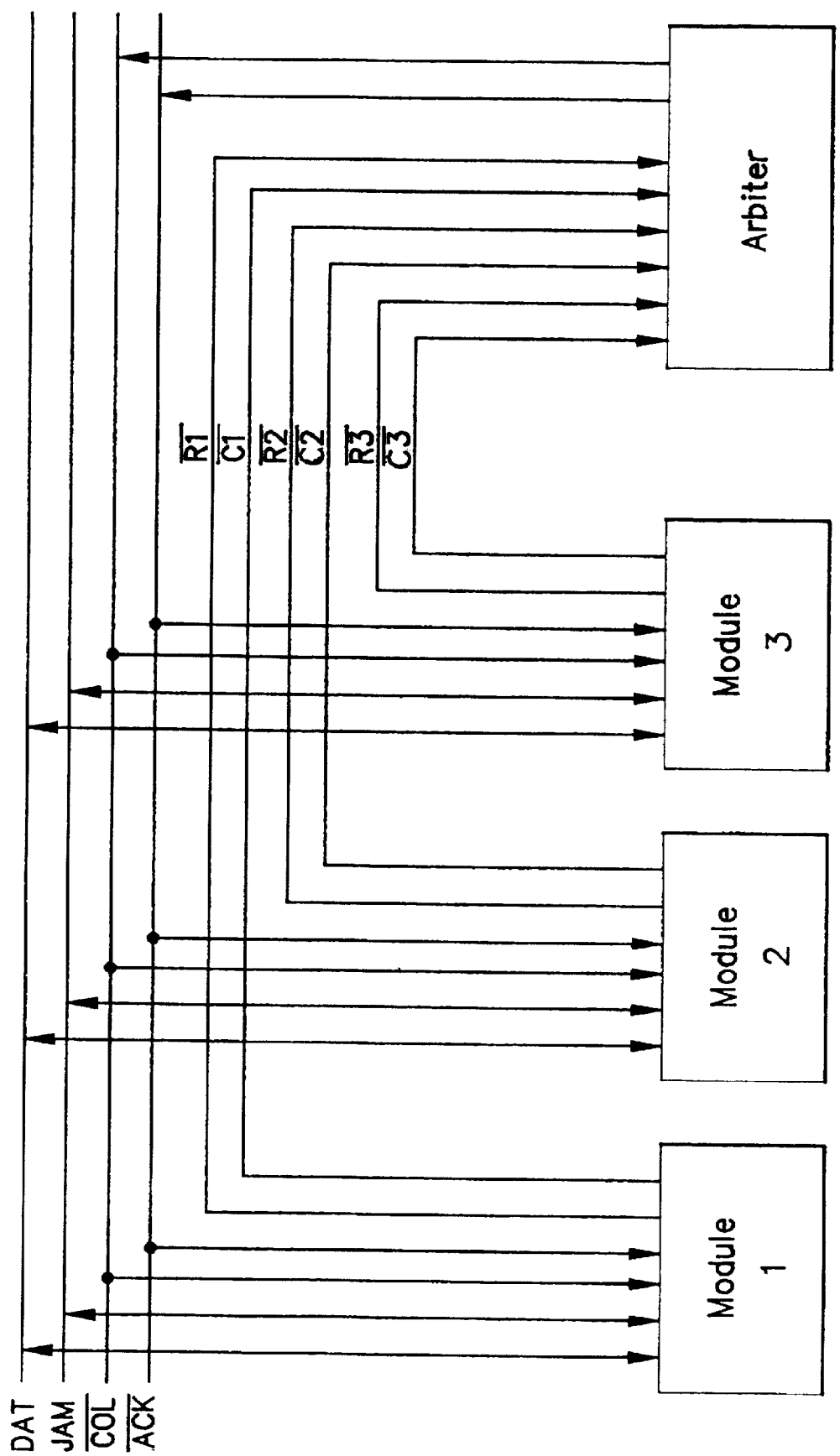
FIG. 3 is a block diagram illustrating the prior art interconnection of an arbiter with multiple repeater controller modules.
Figure 4:
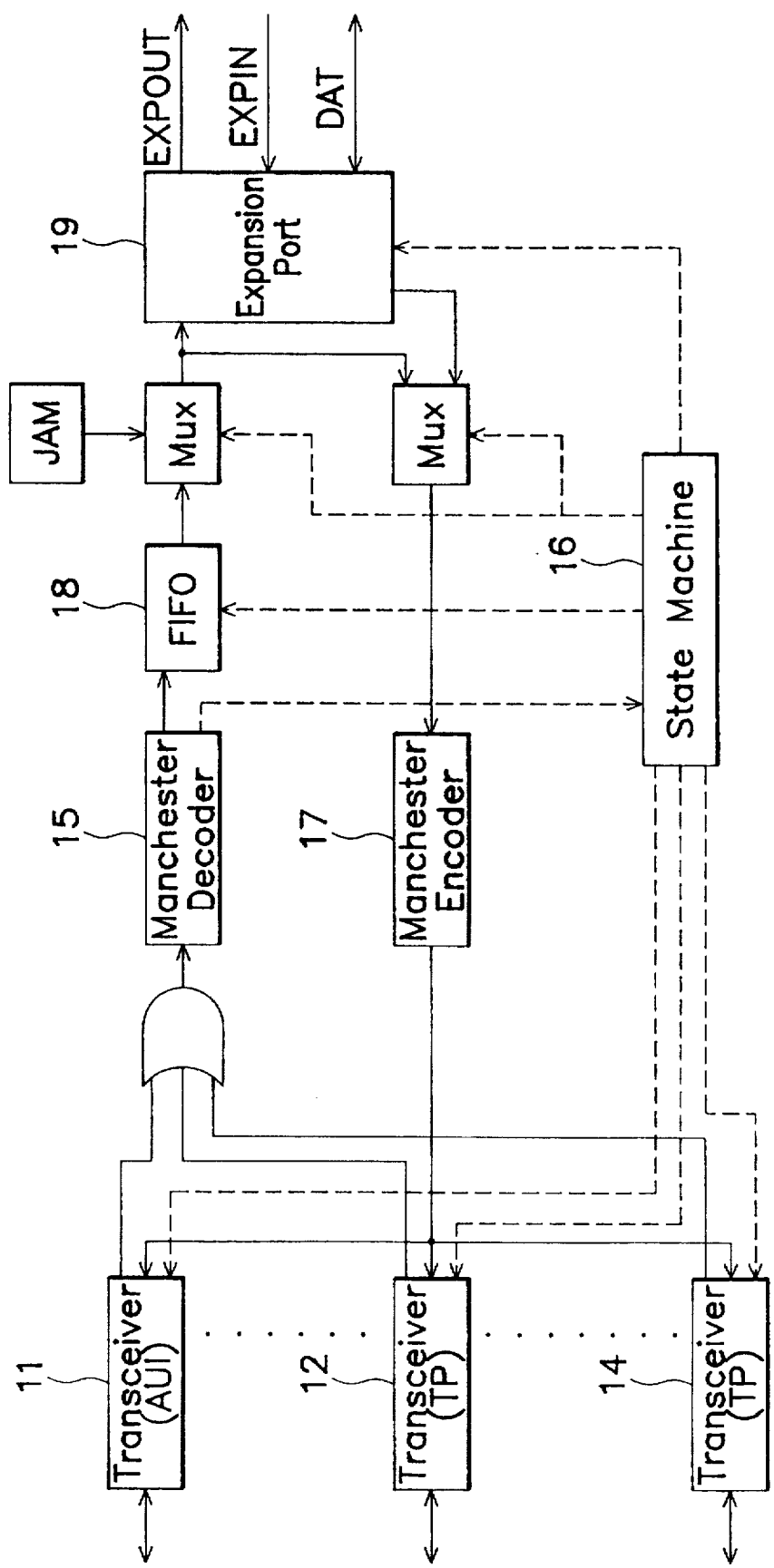
FIG. 4 is a block diagram illustrating an expandable repeater controller according to the present invention.

Referring to FIG. 4, a block diagram shows an expandable repeater controller according to the present invention. The expandable repeater controller includes a plurality of transceivers 11, 12 and 14, state machine 16, first-in-first-out (FIFO) memory 18, Manchester decoder 15, Manchester encoder 17 and expansion port circuit 19. Three ports, EXPOUT, EXPIN and DAT are provided by expansion port circuit 19 of the expandable repeater controller for connecting with other repeater controllers.

Transceivers 11, 12 and 14, which include AUI and TP ports, receive data from and/or transmit data to workstations on the same network. The data sent from transceivers 11, 12 and 14 are provided by Manchester encoder 17, while the data received at each transceiver is sent to Manchester decoder 15 and is processed therein. The data reception and transmission operation of transceivers 11, 12 and 14 is controlled by state machine 16.

State machine 16 also controls FIFO memory 18 to obtain the data processed in Manchester decoder 15. Expansion port circuit 19 can then access the data of FIFO memory 18 and send it to other expandable repeater controllers under the control of state machine 16. A message from Manchester decoder 15 tells state machine 16 what the operational conditions of all the workstations of the network are. Thus, state machine 16 can properly control the operational status of transceivers 11, 12 and 14, FIFO memory 18 and expansion port circuit 19.

If more than one workstation of the network transmits data, that is, if a collision of data occurs in the network, the message from Manchester decoder 15 will make state machine 16 stop the normal operation of all elements of the expandable repeater controller. And then, a jam signal is sent over DATA port through expansion port circuit 19. The solution of the collision situation will be discussed in more detail in the following paragraphs.

The three ports provided by expansion port circuit 19, i.e., ports EXPOUT, EXPIN and DAT, operate synchronously due to a common driving signal, a clock signal CLK (not shown in the drawing). The operational status of the expandable repeater controller is decided by interface signals, that is, logic levels of ports EXPOUT and EXPIN. The relationships between the interface signals, DAT port and the status of the expandable repeater controller are shown in Table 1. It is noted that port EXPIN (or EXPOUT) receives (or transmits) an interface signal if the logic level thereof is expressed as "1". In the present invention, logic level "1" can be a high logic level or a low logic level depending on the construction of the expansion port circuit. In order to facilitate the description of the embodiment, the high logic level is considered as the reception or sending of the interface signal through the ports.

TABLE 1

| Status | EXPOUT | EXPIN | DAT | Repeater Controller |
|---|---|---|---|---|
| 1 | 1 | 0 | output | Data (or jam signals) are sent out through port DAT |
| 2 | 0 | 1 | input | Data (or jam signals) are received through port DAT |
| 3 | 0 | 0 | Z | Idle |
| 4 | 1 | 1 | Z | Data collision occurs, jam signals are broadcast to each transceiver |

The first status in Table 1 is a data transmitting status. As shown in Table 1, if the logic level of port EXPOUT is high and that of port EXPIN is low, data will be transmitted through port DAT to other repeater controllers. The high logic level of port EXPOUT means that the present repeater controller is ready to transmit data. Since port EXPIN connects to port EXPOUT of other repeater controllers, the low logic level thereof means that no data sent will be received by the present repeater controller. Therefore, data of the present repeater controller are transmitted to all other repeater controllers.

The second status in Table 1 is a data receiving status. The low logic level of port EXPOUT means that the present repeater controller has no data to transmit. If any other repeater controllers are going to transmit data, their EXPOUT ports will be in high level, thus pulling up the logic level of port EXPIN of the present repeater controller. Therefore, the present repeater controller is ready to receive data from other repeater controllers through port DAT.

The third status has both port EXPOUT and port EXPIN in low level. It means that there is no data communication between the repeater controllers. That is, the repeater controller is in an idle status. Therefore, port DAT retains a high impedance state, thus providing no data passage.

In case both logic levels of port EXPOUT and port EXPIN are high, i.e., the present repeater controller and at least one other repeater controller want to transmit data at the same time, data collision between repeater controllers may occur. When this occurs, the present repeater controller retains its DAT port in a high impedance state to prevent data output and input. On the other hand, a jam signal is transmitted to each workstation of the network through Manchester encoder 17 and transceiver 11, 12 and 14. The jam signal, which is a signal sequence with format "1010 . . . ", is in conformity to the IEEE 802.3 standard, thus preventing the data input or output of workstations of the network.

Another data collision situation may occur at the transceiver ends of FIG. 4. If more than one workstation which is connected to the present repeater controller is going to send out data, the data collision may occur at the transceivers of the present repeater. The present invention overcomes this problem by transmitting a jam signal through all transceivers and port DAT respectively. In this case, the logic level of port EXPOUT is made high. That is, though the data collision condition is broadcast to all the workstations connected to the present repeater controller, the jam signal is considered as ordinary data for sending to other repeater controllers. On the other hand, the other repeater controllers receive and also broadcast the jam signal to workstations connected thereto. Therefore, all workstations, including those connected to repeater controllers other than the present one, stop sending out data upon receiving the jam signal, thus satisfying the IEEE 802.3 standard.

Figure 5:
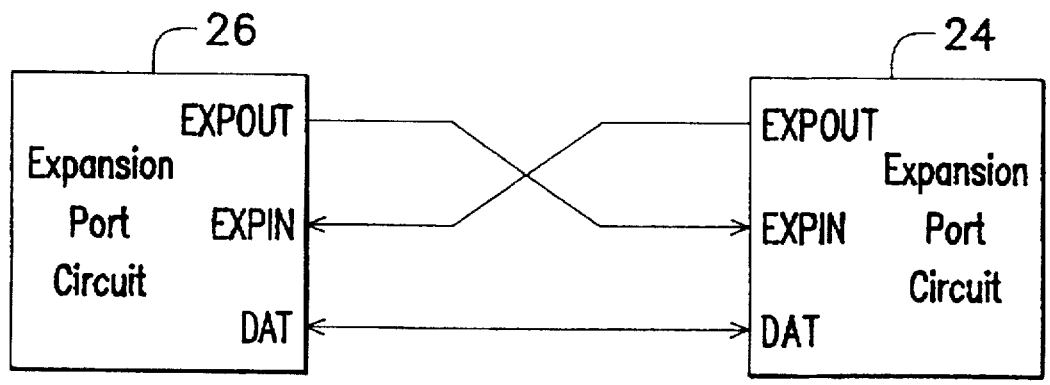
FIG. 5 is a schematic diagram illustrating the connection between two expansion port circuits according to the present invention.

As mentioned above, the present invention is provided with simplified signals between repeater controllers. Since a distributed analysis of data collision is performed in each repeater controller, the expansion to two repeater controllers can be carried out by simply connecting their expansion ports together. FIG. 5 is a schematic diagram illustrating the connection between two similar repeater controllers. Each repeater controller would have its own plurality of transceivers, its own decoder, its own encoder and its own expansion port circuit, each part operating in the same manner as has been described above. Referring to FIG. 5, port EXPOUT of first expansion port circuit 24 is connected to port EXPIN of second expansion port circuit 26. Port EXPIN of first expansion port circuit 24 is connected to port EXPOUT of second expansion port circuit 26. Port DAT of the two expansion port circuits are connected together. The connection between two repeater controllers according to the present invention needs no arbiter function since there is distributed analysis of data collision inside each repeater controller. Therefore, the expanded repeater controllers can be normally operated in accordance with the status shown in Table 1.

Figure 6:
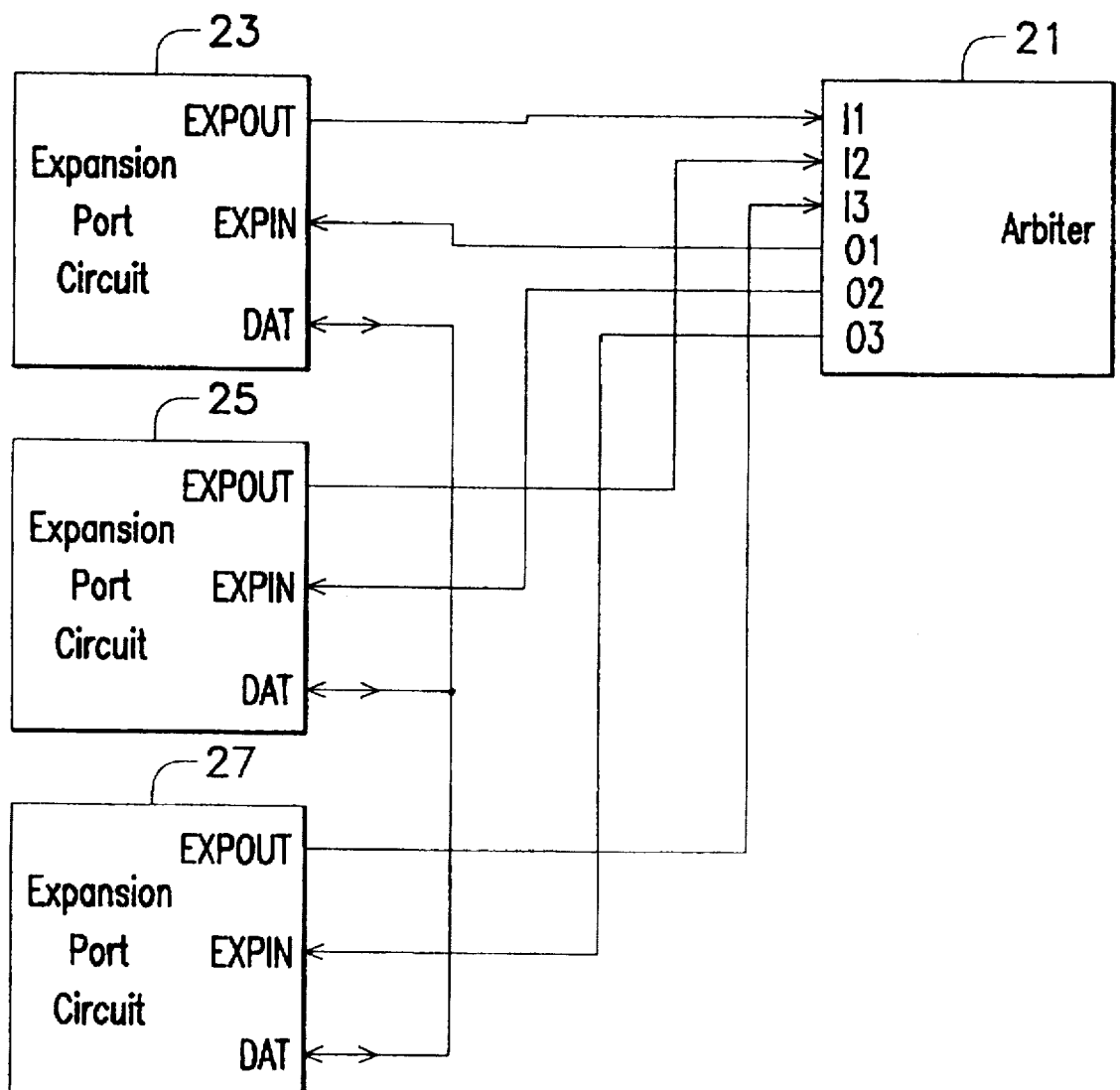
FIG. 6 is a schematic diagram illustrating the connection between three expansion port circuits according to the present invention.

According to the present invention, a simple arbiter is needed when more than two repeater controllers are connected together. For example, referring to FIG. 6, a repeater is expanded by connecting three repeater controllers 23, 25 and 27 to arbiter 21. Each repeater controller would again have its own plurality of transceivers, its own decoder, its own encoder and its own expansion port circuit, each part operating in the same manner as has been described above. Arbiter 21 is provided with three input terminals I1, I2 and I3 and three output terminals O1, O2 and O3. EXPOUT ports of repeater controllers 23, 25 and 27 are connected to input terminals I1, I2 and I3 respectively. EXPIN ports of the repeater controllers are connected to output terminals O1, O2 and O3 respectively. While DAT ports of the repeater controllers are connected together.

Arbiter 21 is a combinational circuit which comprises a number of logic gates. The transfer relationships between input terminals and output terminals of arbiter 21 for three expansion port circuits are $$O1=I2+I3,$$

$$O2=I3+I1, \text{ and}$$

$$O3=I1+I2.$$

Therefore, arbiter 21 can be easily implemented in a Transister-Transister Logic (TTL) circuit. Similar arbiter functions can be applied to the arbiter for connecting more than three repeater controllers, for example, N repeater controllers with N greater than 3. The arbiter for N repeater controllers have N input terminals (I1, I2, ... IN) and N output terminals (O1, O2, ... ON) and whose transfer relationships can be expressed as $$\begin{aligned}
O1 &= I2 + I3 + I4 + \ldots + I(N-1) + IN, \\
O2 &= I1 + I3 + I4 + \ldots + I(N-1) + IN, \\
O3 &= I1 + I2 + I4 + \ldots + I(N-1) + IN, \\
&\vdots \\
O(N-1) &= I1 + I2 + I3 + \ldots + IN, \text{ and} \\
ON &= I1 + I2 + I3 + \ldots + I(N-1).
\end{aligned}$$

And also, these arbiter functions can be easily implemented with TTL circuits.

According to the afore-mentioned operational characteristics, a preferred expansion port circuit of the repeater controller of the present invention will be explained using FIGS. 7 through 10.

Figure 7:
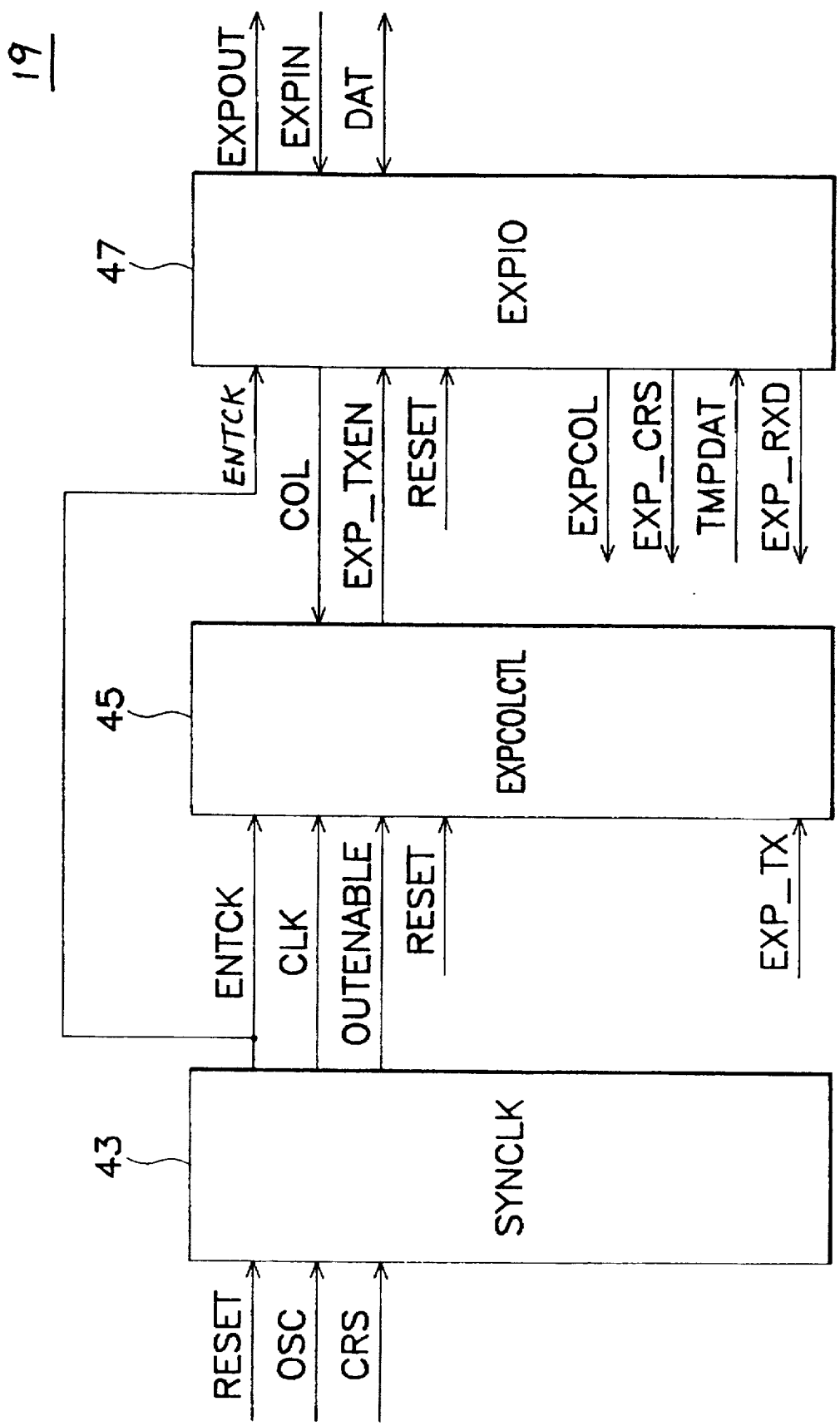
FIG. 7 is a block diagram illustrating a preferred embodiment of an expansion port circuit according to the present invention.

FIG. 7 is a block diagram illustrating expansion port circuit 19 in accordance with the preferred embodiment of the present invention. Referring to FIG. 7, expansion port circuit 19 includes three main portions: SYNCLK circuit 43 for generating synchronous clock signals; EXPCOLCTL circuit 45 for dealing with data collision conditions; and EXPIO circuit 47 for sending and receiving data as well as interface signals. In order to initialize the operational state of the circuit, each of the three portions is provided with a terminal for an external RESET signal.

Figure 8:
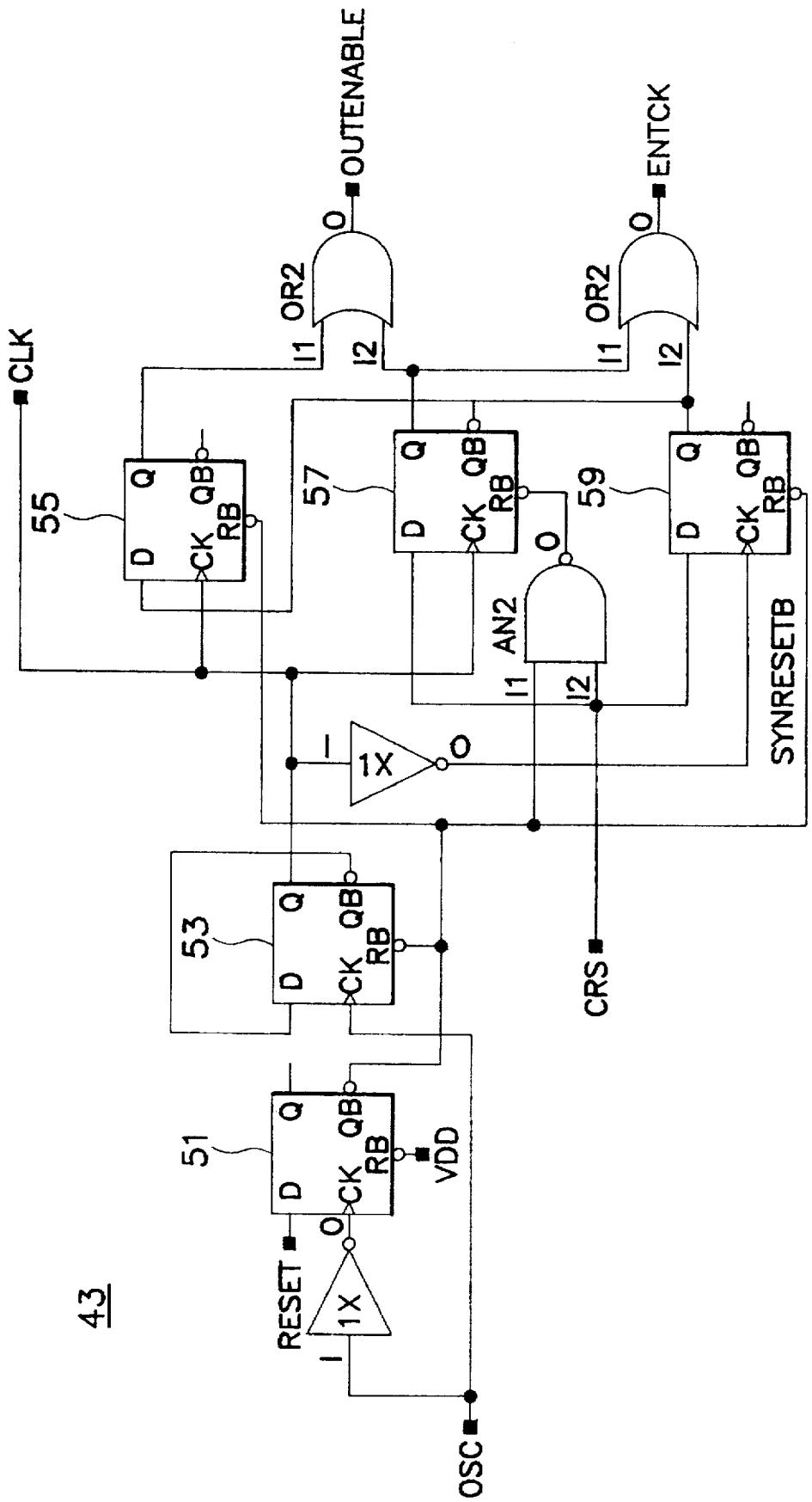
FIG. 8 is a circuit diagram of the SYNCLK circuit of FIG. 7.

FIG. 8 is a more detailed illustration of SYNCLK circuit 43 of FIG. 7. SYNCLK circuit 43 includes a plurality of flip-flops 51, 53, 55, 57 and 59 and a number of logic gates. Flip-flops 51 and 53 are driven by an external signal OSC which is synchronous with other repeater controllers. External signal RESET is the input signal of flip-flop 51. When this signal is sent to each repeater controller, all expansion port circuits of the expanded repeater controllers reset their flip-flop 53 by the output signal of flip-flop 51 and generate clock signal CLK by the driving of synchronous signal OSC. Therefore, the clock signals CLK of all expansion port circuits are synchronous as well as in phase. Thus, the interface signals and data output from each expansion port circuit are in phase with respect to clock signal CLK.

If any transceiver or EXPIN port of the present repeater controller receives data, a signal CRS from state machine 16 becomes a high level, i.e., CRS=1. Therefore, two signals OUTENABLE and ENTCK generated by flip-flops 55, 57 and 59 become high, i.e., OUTENABLE=1 and ENTCK=1. Signal OUTENABLE will enable each transceiver to transmit data, and signal ENTCK will enable the expansion port circuit to output data. When the repeater controller receives data, transceivers for transmitting data will be determined. As CRS=1, high level signal OUTENABLE will enable these transceivers to transmit data in accordance with clock signal CLK. The function of signal ENTCK will be discussed later.

Figure 9:
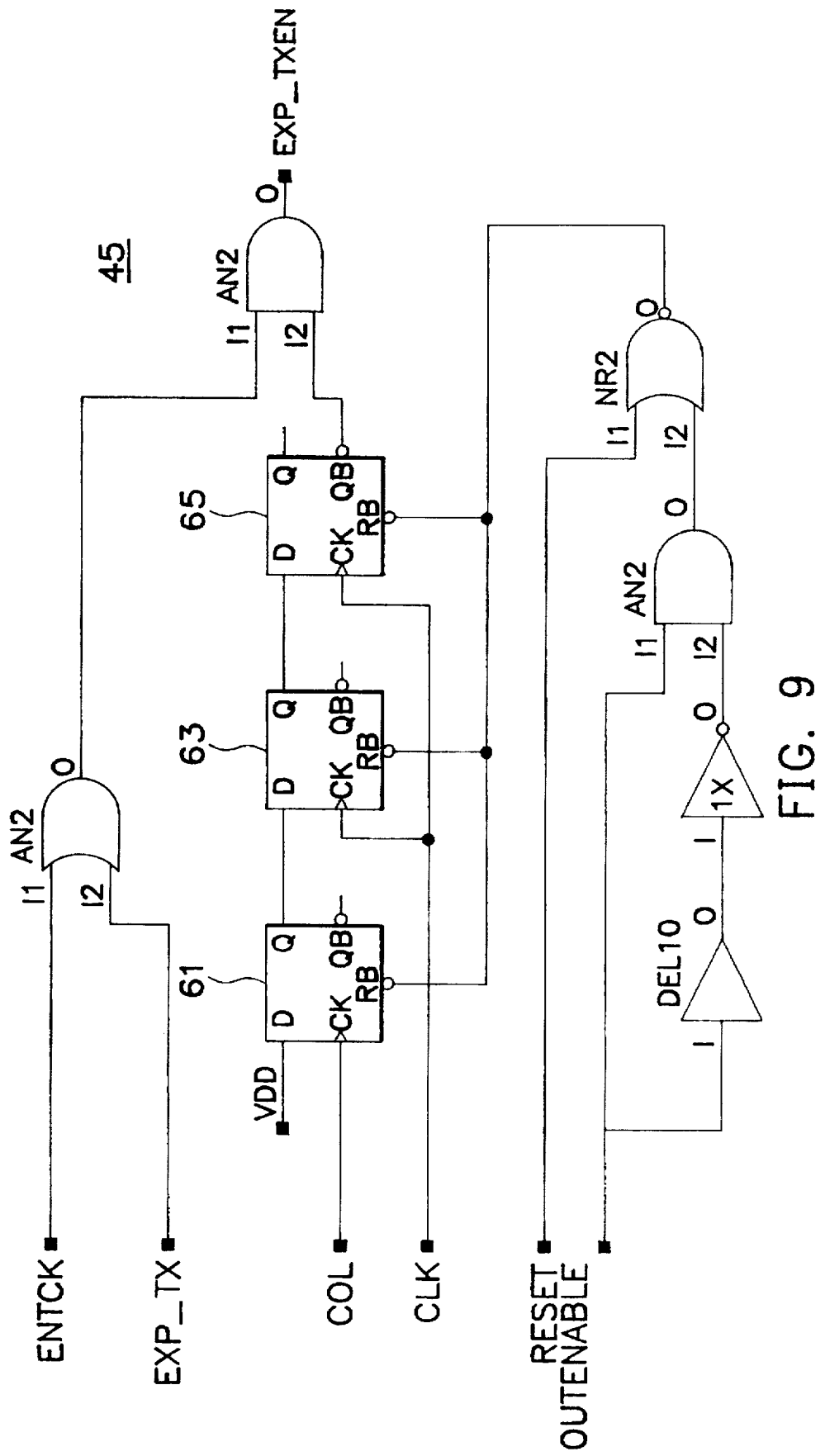
FIG. 9 is a circuit diagram of the EXPCOLCTL circuit of FIG. 7.

Next, a preferred structure of EXPCOLCTL circuit 45 of FIG. 7 is illustrated in FIG. 9. Referring to FIG. 9, EXPCOLCTL circuit 45 includes flip-flops 61, 63 and 65 and a number of logic gates. When signal OUTENABLE becomes high due to CRS=1, flip-flops 61, 63 and 65 will be reset. Further, if signal EXP_TX=1 and signal ENTCK from SYNCLK circuit 43 becomes high, high logic signal EXP_TXEN will be generated and sent out. Signal EXP_TXEN is necessary for data output from expansion port circuit. Whenever data collision occurs between repeater controllers, i.e., logic levels of ports EXPOUT and EXPIN of expansion port circuit are both high, a high logic signal COL will be sent to EXPCOLCTL circuit 45. Flip-flop 61 receives signal COL as an input signal and the remaining two flip-flops will successively respond to the input signal since they are connected in series. Therefore, after two clock cycles, that is, the process time delay of the flip-flops, signal EXP_TXEN will be pulled down to disable the data output of the expansion port circuit. When the data output is stopped by interrupting signal EXP_TXEN, a jam signal will be broadcast to each transceiver connected to the repeater controller. As mentioned above, since EXPCOLCTL circuit 45 has a delay of two clocks when data collision occurs, the expansion port circuit has sufficient time to generate and broadcast the jam signal to the transceivers.

Figure 10:
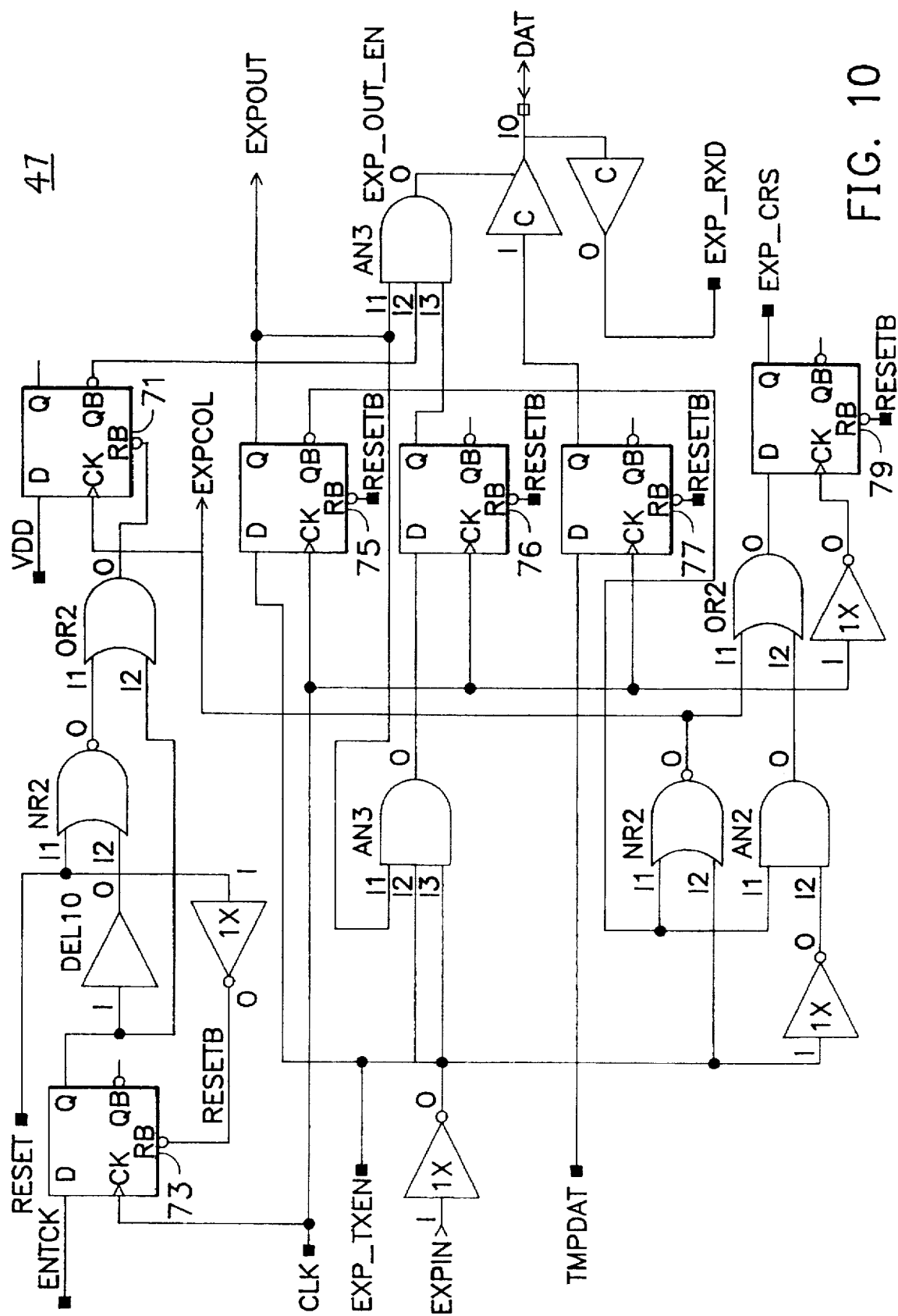
FIG. 10 is a circuit diagram of the EXPIO circuit of FIG. 7.

Furthermore, EXPIO circuit 47 of FIG. 7 is redrawn in detail in FIG. 10. EXPIN port is provided by EXPIO circuit 47, as shown in the left hand side of FIG. 10. EXPOUT and DAT ports are also provided by EXPIO circuit 47, and are shown in upper and lower portions of the right hand side of FIG. 10 respectively. EXPIO circuit 47 includes a plurality of flip-flops and a plurality of logic gates. Signal EXP_TXEN which is from EXPCOLCTL circuit 45 is an input signal of a flip-flop 75, while port EXPOUT is an output end of flip-flop 75. Flip-flop 76 has its input signal from port EXPIN. Data TMPDAT which is stored in FIFO memory 18 of FIG. 4 can be sent out through port DAT when a signal EXP_OUT_EN is high.

When EXP_TXEN=1, the output end of flip-flop 75, i.e., port EXPOUT, has a high logic level. Therefore, the interface signal is sent out through port EXPOUT. If port EXPIN remains at a low level, flip-flop 76 will make signal EXP_OUT_EN become high, thus enabling port DAT to send out data. Since port DAT has data TMPDAT from FIFO memory 18 through flip-flop 77 which is driven by clock signal CLK, the output data will be synchronous with clock signal CLK.

When EXP_TXEN=0, the logic level of port EXPOUT will be pulled down and also make signal EXP_OUT_EN become low, thus preventing data output through port DAT. If port EXPIN has a high logic level at the same time, that is, another repeater controller needs to transmit data, signal EXP_CRS will be made high, and, as stated above, signal CRS will also be high. Therefore, data received through port DAT can be processed in Manchester encoder 17 through port EXP_RXD, and then sent to each transceiver for transmission when signal OUTENABLE becomes high.

If more than one repeater controller is about to transmit data, i.e., ports EXPOUT and EXPIN are both provided with high logic levels, signal EXPCOL will be high, thus preventing data output through port DAT, and informing the repeater controller to generate the jam signal. The logic level of port EXPOUT will become low after two clock cycles, as mentioned above, and there will be no more the data collision condition. Therefore, the repeater controller is in idle state, that is, logic levels of ports EXPOUT and EXPIN are both low.

Though the expandable repeater controller described above simplifies the interface signals and the arbiter structure, the description is not to be construed in a limiting sense. Various modifications of the illustrative embodiment of the invention will be apparent to those skilled in the art and it is contemplated that the appended claims will cover any such modifications that fall within the scope of the invention.

What is claimed is:

1. An expandable repeater controller for connecting workstations, comprising:
   a plurality of transceivers for data communication with said workstations;
   a decoder for decoding data received from said transceivers;
   an encoder for encoding data sent to said transceivers;
   a state machine for controlling operations of said transceivers; and
   an expansion port circuit, controlled by said state machine, for receiving decoded data from said decoder and sending data to said encoder, said expansion port circuit including means for transmitting over a first expansion port an outgoing interface signal when said expandable repeater controller is going to transmit data, means for receiving an incoming interface signal over a second expansion port when said expandable repeater controller is requested to receive data and means for transmitting and receiving data over a third expansion port.

2. The expandable repeater controller of claim 1, further comprising means to broadcast a jam signal to said transceivers when said first expansion port transmits said outgoing interface signal and said second expansion port receives said incoming interface signal at the same time.

3. A dual expandable repeater controller system for connecting workstations, said system comprising a pair of controllers, each one of said pair including:
   a plurality of transceivers for data communication with said workstations, a decoder for decoding data received from said transceivers;
   an encoder for encoding data sent to said transceivers;
   a state machine for controlling operations of said transceivers; and
   an expansion port circuit, controlled by said state machine, for receiving decoded data from said decoder and sending data to said encoder, said expansion port circuit including means for transmitting over a first expansion port an outgoing interface signal when said expandable repeater controller is going to transmit data, means for receiving an incoming interface signal over a second expansion port when said expandable repeater controller is requested to receive data and means for transmitting and receiving data over a third expansion port;
   wherein said first expansion port of a first controller of said pair is connected to said second expansion port of a second controller of said pair, wherein said second expansion port of said first controller is connected to said first expansion port of said second controller, and wherein said third expansion port of said first controller is connected to said third expansion port of said second controller.

4. A triple expandable repeater controller system for connecting workstations, said system comprising:
   three controllers, each one of said controllers including:
   a plurality of transceivers for data communication with said workstations;
   a decoder for decoding data received from said transceivers;
   an encoder for encoding data sent to said transceivers;
   a state machine for controlling operations of said transceivers; and
   an expansion port circuit, controlled by said state machine, for receiving decoded data from said decoder and sending data to said encoder; said expansion port circuit including:
   means for transmitting over a first expansion port an outgoing interface signal when said expandable repeater controller is going to transmit data;
   means for receiving an incoming interface signal over a second expansion port when said expandable repeater controller is requested to receive data; and
   means for transmitting and receiving data over a third expansion port; and
   an arbiter coupled to each of said controllers, said arbiter having three input terminals and three output terminals, said input terminals and said output terminals of said arbiter being represented as I1, I2, I3, O1, O2, and O3, respectively, wherein each first expansion port of said controllers is coupled to a respective input terminal, each second expansion port is coupled to a respective output terminal, and each third expansion port is coupled together, said arbiter including means for satisfying:

$O1=I2+I3$, $O2=I1+I3$ and $O3=I1+I2$.

5. A multiple expandable repeater controller system for connecting workstations, said system comprising:
   a plurality of controllers, each one of said plurality of controllers including:
   a plurality of transceivers for data communication with said workstations,
   a decoder for decoding data received from said transceivers,
   an encoder for encoding data sent to said transceivers, a state machine for controlling operations of said transceivers, and an expansion port circuit, controlled by said state machine, for receiving decoded data from said decoder and sending data to said encoder, said expansion port circuit including:

means for transmitting over a first expansion port an outgoing interface signal when said expandable repeater controller is going to transmit data;

means for receiving an incoming interface signal over a second expansion port when said expandable repeater controller is requested to receive data; and means for transmitting and receiving data over a third expansion port; and an arbiter coupled to each of said controllers, said arbiter having a plurality of input terminals and a plurality of output terminals, said input terminals and said output terminals of said arbiter being represented as I1, I2, I3, . . . , I(N−1), IN, O1, O2, O3, . . . , O(N−1) and ON, respectively, wherein each first expansion port of said controllers is coupled to a respective input terminal, each second expansion port is coupled to a respective output terminal, and each third expansion port is coupled together, said arbiter including means for satisfying:

$$O1 = I2 + I3 + I4 + \ldots + I(N-1) + IN,$$
$$O2 = I1 + I3 + I4 + \ldots + I(N-1) + IN,$$
$$O3 = I1 + I2 + I4 + \ldots + I(N-1) + IN,$$
$$\vdots$$
$$O(N-1) = I1 + I2 + I3 + \ldots + IN, \text{ and}$$
$$ON = I1 + I2 + I3 + \ldots + I(N-1).$$

6. The expandable repeater controller of claim 1, wherein said interface signal is a signal of high logic level.

* * * * *